United States Patent [19]
Ranes

[11] Patent Number: 5,870,017
[45] Date of Patent: Feb. 9, 1999

[54] ACCESSORY CHANNEL EXPANDER FOR VEHICLE ALARM SYSTEM

[76] Inventor: Kristopher W. Ranes, 5021 Rosewood Dr., Roeland Park, Kans. 66205

[21] Appl. No.: 964,785

[22] Filed: Nov. 5, 1997

[51] Int. Cl.$^6$ .............................. B60Q 1/00; G08C 19/00
[52] U.S. Cl. .................... 340/425.5; 340/825.72; 340/825.76; 123/179.2; 307/10.1; 701/2
[58] Field of Search .......................... 340/425.5, 825.65, 340/825.72, 825.75, 825.76; 123/179.2; 307/10.1, 10.8; 701/2, 36, 49; 180/167, 271

[56] References Cited

U.S. PATENT DOCUMENTS

| | | | |
|---|---|---|---|
| 3,947,819 | 3/1976 | Wells | 340/825.75 |
| 4,236,594 | 12/1980 | Ramsperger | 180/167 |
| 4,754,255 | 6/1988 | Sanders et al. | 340/825.31 |
| 4,893,240 | 1/1990 | Karkouti | 364/424.05 |
| 5,095,865 | 3/1992 | Keister | 123/179.5 |
| 5,349,931 | 9/1994 | Gottlieb et al. | 123/179.2 |
| 5,601,058 | 2/1997 | Dyches et al. | 123/179.2 |

*Primary Examiner*—Donnie L. Crosland
*Attorney, Agent, or Firm*—Joseph N. Breaux

[57] ABSTRACT

An accessory channel expander for a vehicle alarm that includes a scrolling mechanism that scrolls through the possible accessory channels until a channel is selected by the user with the remote control activated single auxiliary or accessory channel output of the alarm system. In a preferred embodiment, the accessory channel expander for a vehicle alarm includes an inverting input buffer, a ring counter, a channel expander oscillator, a channel expander reset timer, a channel activation register, a channel activation register reset network, a first number of channel indicator LFDs, and a channel activation decoding and channel relay drive circuit.

16 Claims, 2 Drawing Sheets

ACCESSORY CHANNEL EXPANDER FOR VEHICLE ALARM SYSTEM

TECHNICAL FIELD

The present invention relates to expansion modules for electronic equipment and more particularly to an accessory channel expander for expanding the number of auxiliary devices that are controllable through a single auxiliary control channel of a remotely activated vehicle alarm system; the accessory channel expander including an inverting input buffer, a ring counter, a channel expander oscillator, a channel expander reset timer, a channel activation register, a channel activation register reset network, a first number of channel indicator LEDs, and a channel activation decoding and channel relay drive circuit; the inverting input buffer being connectable to the accessory control output line of the vehicle alarm unit and having an input buffer output; the ring counter having a counter clock input, a counter clear input and a first number of counter output lines; the channel expander oscillator having an activation input in connection with the input buffer output and a clock output in connection with the counter clock input, each cycle of the clock output causing the output on the counter output lines to be incremented; the channel expander reset timer having a timer activation input in connection with the input buffer output and a timer output in connection with the counter clear input, the channel expander reset timer generating a counter reset signal on the timer output a first predetermined period after receiving a timer start signal on the timer activation input; the channel activation register having a first number of register data input lines each in connection with one of the first number of counter output lines, a first number of register output lines, a register load control input and a clear register input, the channel activation register transferring the signals on the data input lines to the register output lines upon receiving a load signal on the register load control input, the channel activation register loading a predetermined null output on the register output lines upon receiving a clear register signal on the clear register input; the channel activation register reset network being in connection between the input buffer output and the clear register input; the first number of channel indicator LEDs each being in connection with one of the first number of counter output lines in a manner to visually indicate to a user the expanded accessory channel to be activated upon a change of state of the single auxiliary control channel of the remotely activated vehicle alarm system; the channel activation decoding and channel relay drive circuit including a second number of decoding inputs in connection with the first number of register output lines, the channel activation decoding and channel relay drive circuit including a first number of device control relays; each of the first number of device control relays being activated by a predetermined output combination on the first number of register output lines.

BACKGROUND OF THE INVENTION

Car alarms often include an auxiliary or accessory channel output that can be used to activate an accessory by operation of the alarm system remote control. Although one accessory may be sufficient for some individuals, other individuals may wish to selectively operate a desired accessory selected from a group consisting of two or more accessory devices. For these individuals it would of course be desirable to have an accessory channel expander for a vehicle alarm that could be connected to the single auxiliary or accessory channel output of the vehicle alarm and that included a mechanism for using that remote control activated single auxiliary or accessory channel output to select the desired accessory from a group of two or more accessories. It would also be desirable to have an accessory channel expander for a vehicle alarm that included a scrolling mechanism that scrolled or stepped through the possible channels and allowed the user to use the remote control activated single auxiliary or accessory channel output of the alarm system to selectively activate the desired accessory channel through operation of the alarm remote control.

SUMMARY OF THE INVENTION

It is thus an object of the invention to provide an accessory channel expander for a vehicle alarm that can be used to selectively operate a desired accessory selected from a group consisting of two or more accessory devices.

It is a further object of the invention to provide an accessory channel expander for a vehicle alarm that includes a scrolling mechanism that scrolls through the possible accessory channels until a channel is selected by the user with the remote control activated single auxiliary or accessory channel output of the alarm system.

It is a still further object of the invention to provide an accessory channel expander for a vehicle alarm that includes an inverting input buffer, a ring counter, a channel expander oscillator, a channel expander reset timer, a channel activation register, a channel activation register reset network, a first number of channel indicator LEDs, and a channel activation decoding and channel relay drive circuit; the inverting input buffer being connectable to the accessory control output line of the vehicle alarm unit and having an input buffer output; the ring counter having a counter clock input, a counter clear input and a first number of counter output lines; the channel expander oscillator having an activation input in connection with the input buffer output and a clock output in connection with the counter clock input, each cycle of the clock output causing the output on the counter output lines to be incremented; the channel expander reset timer having a timer activation input in connection with the input buffer output and a timer output in connection with the counter clear input, the channel expander reset timer generating a counter reset signal on the timer output a first predetermined period after receiving a timer start signal on the timer activation input; the channel activation register having a first number of register data input lines each in connection with one of the first number of counter output lines, a first number of register output lines, a register load control input and a clear register input, the channel activation register transferring the signals on the data input lines to the register output lines upon receiving a load signal on the register load control input, the channel activation register loading a predetermined null output on the register output lines upon receiving a clear register signal on the clear register input; the channel activation register reset network being in connection between the input buffer output and the clear register input; the first number of channel indicator LEDs each being in connection with one of the first number of counter output lines in a manner to visually indicate to a user the expanded accessory channel to be activated upon a change of state of the single auxiliary control channel of the remotely activated vehicle alarm system; the channel activation decoding and channel relay drive circuit including a second number of decoding inputs in connection with the first number of register output lines, the channel activation decoding and channel relay drive circuit including a first number of device control relays; each of the first number of device control relays being activated by a predetermined output combination on the first number of register output lines.

It is a still further object of the invention to provide an accessory channel expander for a vehicle alarm that accomplishes some or all of the above objects in combination.

Accordingly, an accessory channel expander for a vehicle alarm system is provided. The accessory channel expander includes an inverting input buffer, a ring counter, a channel expander oscillator, a channel expander reset timer, a channel activation register, a channel activation register reset network, a first number of channel indicator LEDs, and a channel activation decoding and channel relay drive circuit; the inverting input buffer being connectable to the accessory control output line of the vehicle alarm unit and having an input buffer output; the ring counter having a counter clock input, a counter clear input and a first number of counter output lines; the channel expander oscillator having an activation input in connection with the input buffer output and a clock output in connection with the counter clock input, each cycle of the clock output causing the output on the counter output lines to be incremented; the channel expander reset timer having a timer activation input in connection with the input buffer output and a timer output in connection with the counter clear input, the channel expander reset timer generating a counter reset signal on the timer output a first predetermined period after receiving a timer start signal on the timer activation input; the channel activation register having a first number of register data input lines each in connection with one of the first number of counter output lines, a first number of register output lines, a register load control input and a clear register input, the channel activation register transferring the signals on the data input lines to the register output lines upon receiving a load signal on the register load control input, the channel activation register loading a predetermined null output on the register output lines upon receiving a clear register signal on the clear register input; the channel activation register reset network being in connection between the input buffer output and the clear register input; the first number of channel indicator LEDs each being in connection with one of the first number of counter output lines in a manner to visually indicate to a user the expanded accessory channel to be activated upon a change of state of the single auxiliary control channel of the remotely activated vehicle alarm system; the channel activation decoding and channel relay drive circuit including a second number of decoding inputs in connection with the first number of register output lines, the channel activation decoding and channel relay drive circuit including a first number of device control relays; each of the first number of device control relays being activated by a predetermined output combination on the first number of register output lines.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
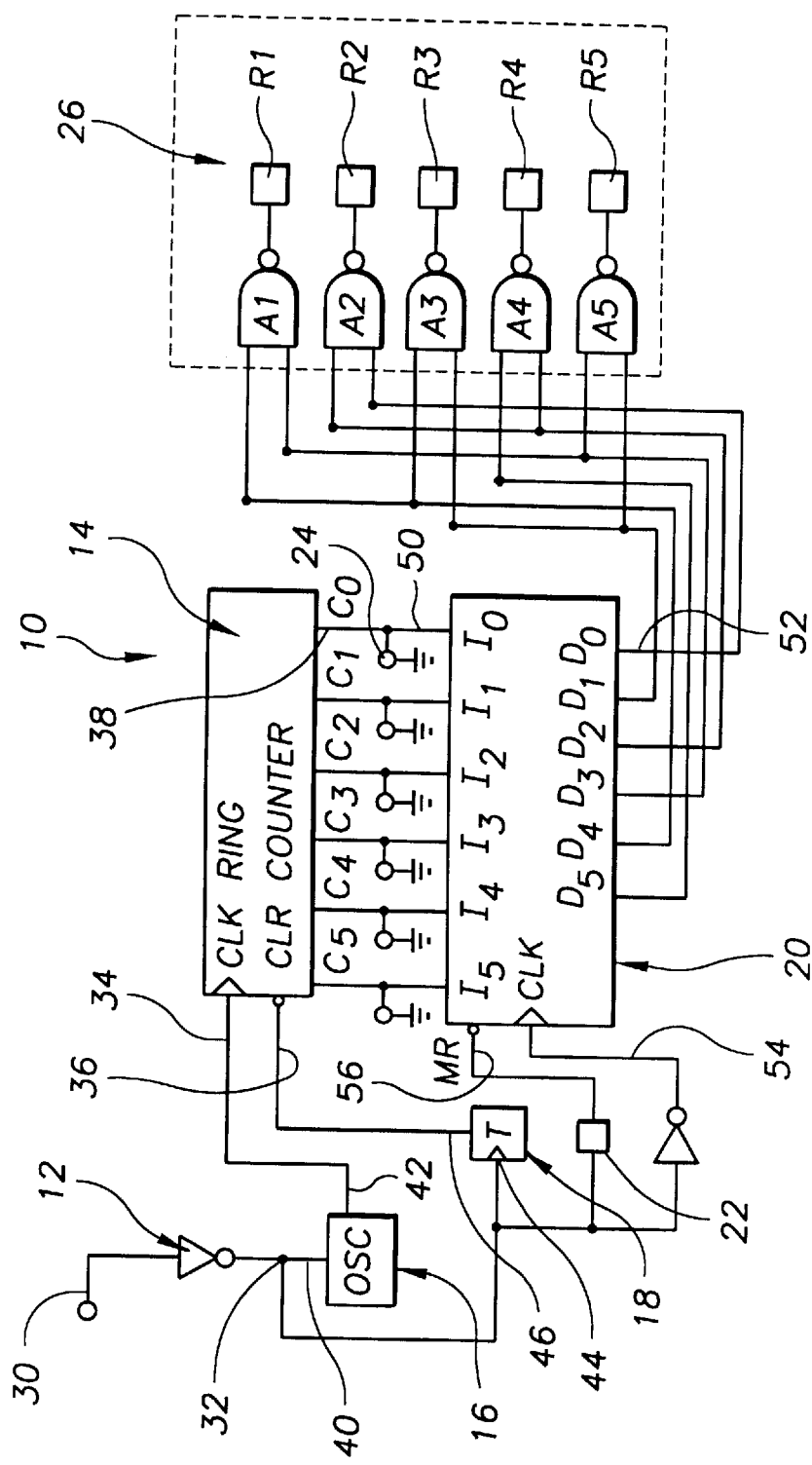
FIG. 1 is a schematic diagram of an exemplary embodiment of the accessory channel expander for vehicle alarms of the present invention showing a control output line of the vehicle alarm unit in connection with the inverting input buffer of the alarm channel expander; the channel expander oscillator; the channel expander reset timer; the channel activation register reset network; the ring counter; the channel indicator LEDs; the channel activation register; and the channel activation decoding and channel relay drive circuitry.

FIG. 1 shows a schematic diagram of a first exemplary embodiment of the accessory channel expander for vehicle alarms of the present invention generally designated by the numeral 10. In this embodiment, accessory channel expander 10 includes an inverting input buffer, generally designated 12; a ring counter, generally designated 14; a channel expander oscillator, generally designated 16; a channel expander reset timer, generally designated 18; a channel activation register, generally designated 20; a channel activation register reset network, generally designated 22; six channel indicator LEDs 24; and a channel activation decoding and channel relay drive circuit, generally designated 26.

Inverting input buffer 12 is connectable to the accessory control output line 30 of the vehicle alarm unit and has an input buffer output 32. Ring counter 14 has a counter clock input 34, a counter clear input 36 and a six counter output lines 38. Channel expander oscillator 16 has an activation input 40 in connection with input buffer output 32 and a clock output 42 in connection with counter clock input 34. Each cycle of clock output 42 causes the output on the six counter output lines 38 to be incremented. Channel expander reset timer 18 has a timer activation input 44 in connection with input buffer output 32 and a timer output 46 in connection with counter clear input 36. Channel expander reset timer 44 generates a counter reset signal on timer output 46 a first predetermined period, in this embodiment thirty seconds, after receiving a timer start signal on timer activation input 44. Channel activation register 20 has six register data input lines 50, one in connection with each of the six counter output lines 38; six register output lines 52, a register load control input 54 and a clear register input 56. Channel activation register 20 transfers the signals on the six data input lines 50 out onto the six register output lines 52 upon receiving a load signal on register load control input 54. Channel activation register 20 loads a predetermined null output, in this embodiment binary zero, on the six register output lines 52 upon receiving a clear register signal on clear register input 56. Channel activation register reset network 22 is connected between input buffer output 32 and clear register input 56. Channel activation register reset network 22 transfers the appropriate clear register signal to clear register input 56 when the accessory control output line 30 is deactivated by operation of the remote control. In operation depressing the remote control accessory activation button cause the accessory control output line 30 to generate a start signal that causes the ring counter to start sequencing through its outputs, individually illuminating in sequence each of the LEDs 24. When the user views the LED 24 that indicates the desired accessory, he/she releases the remote control accessory activation button and causes the accessory control output line 30 to generate a latch signal that latches the desired accessory output onto the six register output lines 52 for decoding by the channel activation decoding and channel relay drive circuit 26. in this embodiment, channel activation decoding and channel relay drive circuit 26 includes five two input NAND logic gates 60 each having an output 62 that drives an accessory control relay 64.

Figure 2:
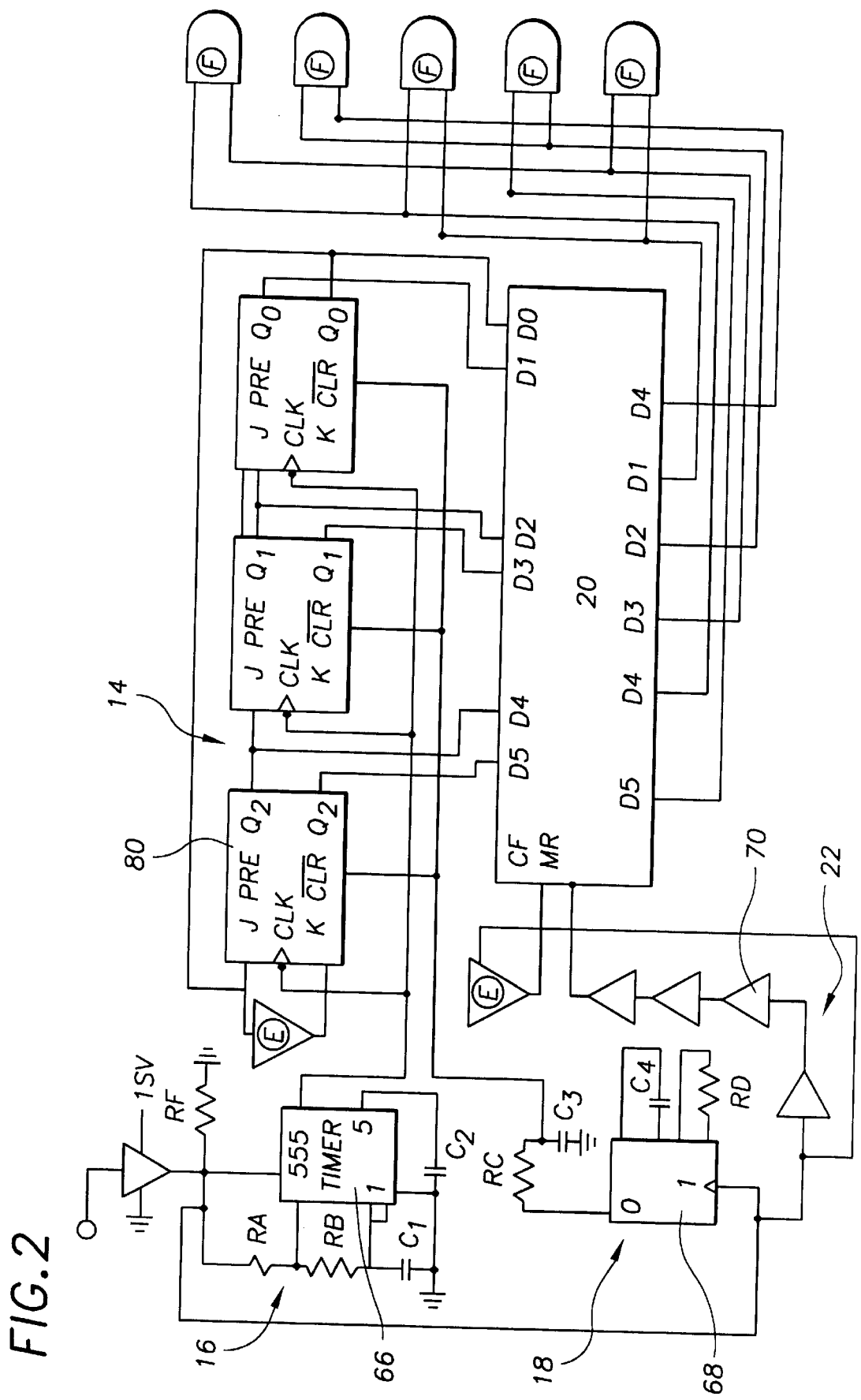
FIG. 2 is a second schematic diagram of the exemplary accessory channel expander of FIG. 1 showing the channel expander oscillator including a 555 timer chip; the channel expander reset timer including a one-shot mono-stable multi-vibrator; the channel activation register reset network including a number of serially connected inverters; the ring counter including a number of interconnected J-K flip flops; the conventional light emitting diodes used as the channel indicator LED's; the channel activation register including six edge triggered D flip flops; and the channel activation decoding and relay drive circuitry including a number of NAND logic gates.

FIG. 2 shows a second exemplary channel expander 10a that is identical in operation to channel expander 10 and wherein channel expander oscillator 16 includes a 555 timer chip 66; channel expander reset timer 18 includes a one-shot mono-stable multi-vibrator 68; channel activation register reset network 22 includes four serially connected inverters 70; ring counter 14 includes a number of interconnected J-K flip flops 80; and channel activation register 20 includes a number of positive edge triggered D flip flops.

It can be seen from the preceding description that an accessory channel expander for a vehicle alarm has been provided that can be used to selectively operate a desired accessory selected from a group consisting of two or more accessory devices; that includes a scrolling mechanism that scrolls through the possible accessory channels until a channel is selected by the user with the remote control activated single auxiliary or accessory channel output of the alarm system; and that includes an inverting input buffer, a ring counter, a channel expander oscillator, a channel expander reset timer, a channel activation register, a channel activation register reset network, a first number of channel indicator LEDs, and a channel activation decoding and channel relay drive circuit; the inverting input buffer being connectable to the accessory control output line of the vehicle alarm unit and having an input buffer output; the ring counter having a counter clock input, a counter clear input and a first number of counter output lines; the channel expander oscillator having an activation input in connection with the input buffer output and a clock output in connection with the counter clock input, each cycle of the clock output causing the output on the counter output lines to be incremented; the channel expander reset timer having a timer activation input in connection with the input buffer output and a timer output in connection with the counter clear input, the channel expander reset timer generating a counter reset signal on the timer output a first predetermined period after receiving a timer start signal on the timer activation input; the channel activation register having a first number of register data input lines each in connection with one of the first number of counter output lines, a first number of register output lines, a register load control input and a clear register input, the channel activation register transferring the signals on the data input lines to the register output lines upon receiving a load signal on the register load control input, the channel activation register loading a predetermined null output on the register output lines upon receiving a clear register signal on the clear register input; the channel activation register reset network being in connection between the input buffer output and the clear register input; the first number of channel indicator LEDs each being in connection with one of the first number of counter output lines in a manner to visually indicate to a user the expanded accessory channel to be activated upon a change of state of the single auxiliary control channel of the remotely activated vehicle alarm system; the channel activation decoding and channel relay drive circuit including a second number of decoding inputs in connection with the first number of register output lines, the channel activation decoding and channel relay drive circuit including a first number of device control relays; each of the first number of device control relays being activated by a predetermined output combination on the first number of register output lines.

It is noted that the embodiment of the accessory channel expander for vehicle alarm described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An accessory channel expander for vehicle alarm comprising:

an inverting input buffer;

a ring counter;

a channel expander oscillator;

a channel expander reset timer;

a channel activation register;

a channel activation register reset network;

a first number of illuminated channel indicators; and a channel activation decoding and channel relay drive circuit;

said inverting input buffer being connectable to said accessory control output line of said vehicle alarm unit and having an input buffer output;

said ring counter having a counter clock input, a counter clear input and a first number of counter output lines;

said channel expander oscillator having an activation input in connection with said input buffer output and a clock output in connection with said counter clock input, each cycle of said clock output causing said output on said counter output lines to be incremented;

said channel expander reset timer having a timer activation input in connection with said input buffer output and a timer output in connection with said counter clear input, said channel expander reset timer generating a counter reset signal on said timer output a first predetermined period after receiving a timer start signal on said timer activation input;

said channel activation register having a first number of register data input lines each in connection with one of said first number of counter output lines, a first number of register output lines, a register load control input and a clear register input, said channel activation register transferring said signals on said data input lines to said register output lines upon receiving a load signal on said register load control input, said channel activation register loading a predetermined null output on said register output lines upon receiving a clear register signal on said clear register input;

said channel activation register reset network being in connection between said input buffer output and said clear register input; said first number of channel indicator LEDs each being in connection with one of said first number of counter output lines in a manner to visually indicate to a user said expanded accessory channel to be activated upon a change of state of said single auxiliary control channel of said remotely activated vehicle alarm system;

said channel activation decoding and channel relay drive circuit Including a second number of decoding inputs in connection with said first number of register output lines, said channel activation decoding and channel relay drive circuit including a first number of device control relays;

each of said first number of device control relays being activated by a predetermined output combination on said first number of register output lines.

2. the accessory channel expander for vehicle alarm of claim 1, wherein:

said channel expander oscillator including a timer chip.

3. The accessory channel expander for vehicle alarm of claim 1, wherein:

said channel expander reset timer includes a one-shot mono-stable multi-vibrator.

4. The accessory channel expander for vehicle alarm of claim 1 wherein:

said channel activation register reset network includes a number of serially connected inverters.

5. The accessory channel expander for vehicle alarm of claim 1 wherein:

said ring counter includes a number of interconnected J-K flip flops.

6. The accessory channel expander for vehicle alarm of claim 2, wherein:

said channel expander reset timer includes a one-shot mono-stable multi-vibrator.

7. The accessory channel expander for vehicle alarm of claim 2 wherein:

said channel activation register reset network includes a number of serially connected inverters.

8. The accessory channel expander for vehicle alarm of claim 2 wherein:

said ring counter includes a number of interconnected J-K flip flops.

9. The accessory channel expander for vehicle alarm of claim 6 wherein:

said channel activation register reset network includes a number of serially connected inverters.

10. The accessory channel expander for vehicle alarm of claim 6 wherein:

said ring counter includes a number of interconnected J-K flip flops.

11. The accessory channel expander for vehicle alarm of claim 9 wherein:

said ring counter includes a number of interconnected J-K flip flops.

12. The accessory channel expander for vehicle alarm of claim 7 wherein:

said ring counter includes a number of interconnected J-K flip flops.

13. The accessory channel expander for vehicle alarm of claim 3 wherein:

said channel activation register reset network includes a number of serially connected inverters.

14. The accessory channel expander for vehicle alarm of claim 3 wherein:

said ring counter includes a number of interconnected J-K flip flops.

15. The accessory channel expander for vehicle alarm of claim 13 wherein:

said ring counter includes a number of interconnected J-K flip flops.

16. The accessory channel expander for vehicle alarm of claim 4 wherein:

said ring counter includes a number of interconnected J-K flip flops.

* * * * *